United States Patent [19]

Takashi et al.

[11] Patent Number: 4,892,176
[45] Date of Patent: Jan. 9, 1990

[54] ELECTROMAGNETIC CLUTCH HAVING HIGH TORQUE TRANSFER

[75] Inventors: Matsushita Takashi, Isesaki; Uehara Fumiaki, Takasaki, both of Japan

[73] Assignee: Sanden Corporation, Gunma, Japan

[21] Appl. No.: 93,697

[22] Filed: Sep. 8, 1987

[30] Foreign Application Priority Data

Sep. 5, 1986 [JP] Japan .................. 61-135595[U]
Sep. 5, 1986 [JP] Japan .................. 61-135596[U]

[51] Int. Cl.⁴ ............................................. F16D 27/10
[52] U.S. Cl. .............................. 192/84 C; 192/107 R; 335/220
[58] Field of Search .......... 192/84 B, 84 C, 107 R; 335/220, 279, 281

[56] References Cited

U.S. PATENT DOCUMENTS

| | | | |
|---|---|---|---|
| 3,162,285 | 12/1964 | Sala | 335/281 X |
| 3,384,213 | 5/1968 | Bernard et al. | 192/84 C |
| 3,530,416 | 9/1970 | Klinkenberg | 192/84 C X |
| 3,842,378 | 10/1974 | Pierce | 335/220 |
| 4,090,161 | 5/1978 | Fuhrer et al. | 335/281 |
| 4,190,141 | 2/1980 | Bennett et al. | 192/84 C |
| 4,227,600 | 10/1980 | Shirai | 192/84 C |
| 4,632,236 | 12/1986 | Koitabashi | 192/84 C |
| 4,705,973 | 11/1987 | Koitabashi | 310/78 |

FOREIGN PATENT DOCUMENTS

| | | |
|---|---|---|
| 0154230 | 9/1985 | European Pat. Off. |
| 960074 | 6/1964 | United Kingdom. |
| 966750 | 8/1964 | United Kingdom. |
| 994515 | 6/1965 | United Kingdom. |
| 1277868 | 6/1972 | United Kingdom. |
| 2017232 | 10/1979 | United Kingdom. |
| 1586180 | 3/1981 | United Kingdom. |

Primary Examiner—Rodney H. Bonck
Assistant Examiner—Richard M. Lorence
Attorney, Agent, or Firm—Banner, Birch, McKie & Beckett

[57] ABSTRACT

An electromagnetic clutch is disclosed which includes a first rotatable member rotatably supported on a first bearing. The first rotatable member is provided with at least one annular groove along an outer surface thereof for receiving a belt rotatably connecting the first rotatable member to an external driving source. The first rotatable member further has a magnetic axial end plate. The magnetic axial end plate has at least one arcuate slit. A second rotatable member is rotatably supported on a second bearing. An annular magnetic member is supported on the second rotatable member so as to be capable of limited axial movement and faces the axial end plate of the first rotatable member with an axial gap therebetween. An electromagnet is associated with one of the rotatable members and the annular magnetic member for attracting the other of the rotatable members and the annular magnetic member. At least one of either the axial end plate or the annular magnetic member has an annular groove to increase the torque transfer. Therefore, the average effective radius and frictional torque is increased.

2 Claims, 3 Drawing Sheets

ELECTROMAGNETIC CLUTCH HAVING HIGH TORQUE TRANSFER

TECHNICAL FIELD

This invention relates generally to an electromagnetic clutch, and in particular, to an improved clutch rotor and armature plate to increase the torque transfer of the clutch.

BACKGROUND OF THE INVENTION

Electromagnetic clutches are well known in the prior art and may be used to control the transfer of power from an automobile engine to the refrigerant compressor of an automotive air conditioning system. The general structure of an electromagnetic clutch for an automobile air conditioning compressor is disclosed in U.S. Pat. Nos. 3,044,594 and 3,082,933.

The construction of a conventional electromagnetic clutch is shown in FIG. 1. The clutch assembly is disposed on the outer peripheral portion of annular tubular extension 2, which projects from an end surface of compressor housing 1 to surround drive shaft 3. Drive shaft 3 is rotatably supported in compressor housing 1 by bearing 4. The clutch assembly includes a rotor 5 rotatably mounted on tubular extension 2 by bearings 6. The rotor is driven by a belt coupled to the automobile engine (not shown). Rotor 5 is provided with a plurality of concentric arcuate slits 5a, 5b, forming magnetic pole face 5c. A hub 7 is fixed to the outer terminal end of drive shaft 3 extending beyond tubular extension 2. Armature plate 8 is flexibly jointed to hub 7 by a plurality of leaf springs 9. Leaf springs 9 are fixed to the outer surface of armature plate 8 by rivets 11. The axial end surface of armature plate 8 faces pole face 5c of rotor 5 with a predetermined axial air gap G therebetween. The axial end surface of armature plate 8 is provided with concentric arcuate slits 8a, forming pole face 8b. Slits 8a are positioned to be opposite the midway point between slits 5a, 5b on pole face 5c.

Electromagnet 10 is mounted on compressor hoursing 1 concentric with drive shaft 3. Electromagnet 10 includes an electromagnetic coil 101 disposed within annular hollow portion 5d of rotor 5 and is surrounded by an air gap. When coil 101 of electromagnet 10 is energized, pole face 8b is attracted to pole face 5c. Thus, drive shaft 3 rotates as rotor 5 is turned by the engine. If coil 101 of electromagnet 10 is not energized, pole face 8b of armature plate 8 is separated from pole face 5c of rotor 5 by the recoil strength of leaf springs 9. Rotor 5 still rotates in response to the engine output, but drive shaft 3 is not turned.

In the above construction of the electromagnetic clutch, magnetic flux M, which is produced around electromagnet 10 by the energizing of electromagnetic coil 101, passes through a magnetic passageway formed within electromagnet 10, rotor 5 and armature plate 8. Since magnetic flux tends to follow the shortest path through the magnetic passageway, the flux M from pole face 5c of rotor 5 passes through rivet 11, rotor 5 and armature plate 8 in a zig-zag manner, as indicated by the dotted line in FIG. 1. If flux M follows this path through the magnetic passageway, a frictional torque small in comparison with the strength of the magnetic field is generated.

SUMMARY OF THE INVENTION

Accordingly, it is a primary object of this invention to provide an electromagnetic clutch having a high torque transfer without an increase in the magnetic field strength.

It is another object of this invention to provide a compact electromagnetic clutch with an increased torque transfer.

An electromagnetic clutch according to this invention includes a first rotatable member rotatably supported on a first bearing. The first rotatable member is connected to an external driving source and has a magnetic axial end plate. The magnetic axial end plate has at least one arcuate slit concentric with the axis the first rotatable member. A second rotatable member is rotatably supported on a second bearing. An annular magnetic member is supported on the second rotatable member in such a manner to permit limited axial movement and faces the axial end plate of the first rotatable member with a gap therebetween. The annular magnetic member has at least one arcuate slit. An electromagnet is associated with the first rotatable member for attracting the annular magnetic member of the second rotatable member. At least one of the axial end plate or the annular magnetic member has an annular groove to increase the torque transfer of the clutch.

Further objects, features and other aspects of this invention will be understood from the following detailed description of the preferred embodiments of this invention with reference to the attached drawings.

DETAILED DESCRIPTION OF THE PREFERRED EMBODIMENT

Figure 1:
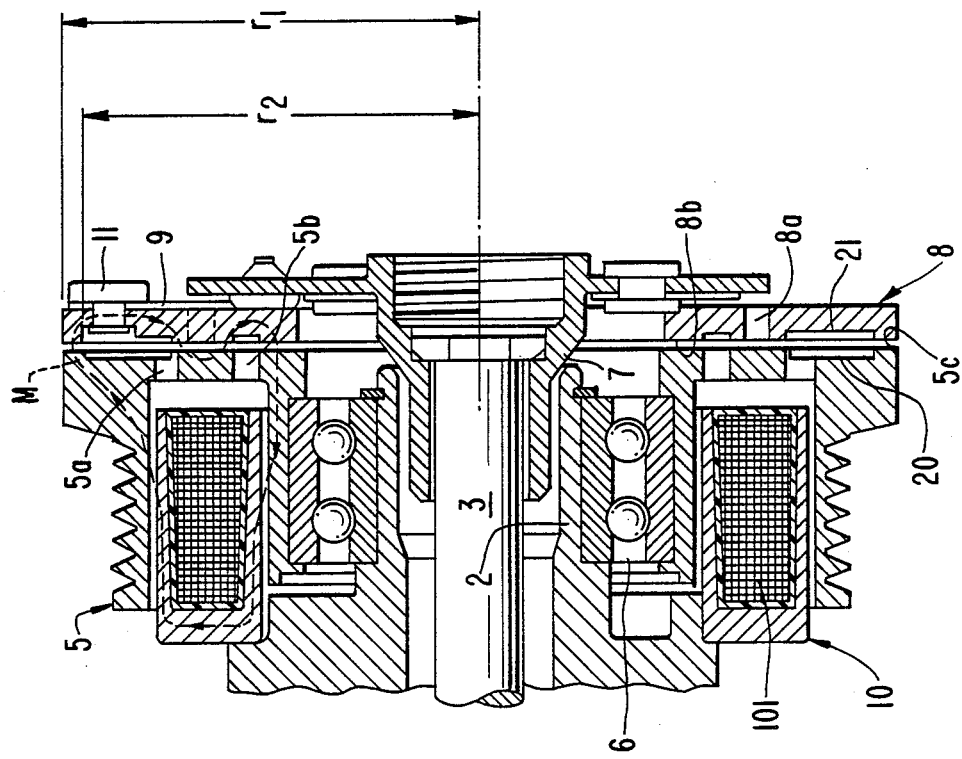
FIG. 1 is a cross-sectional view of a conventional electromagnetic clutch.
Figure 2:
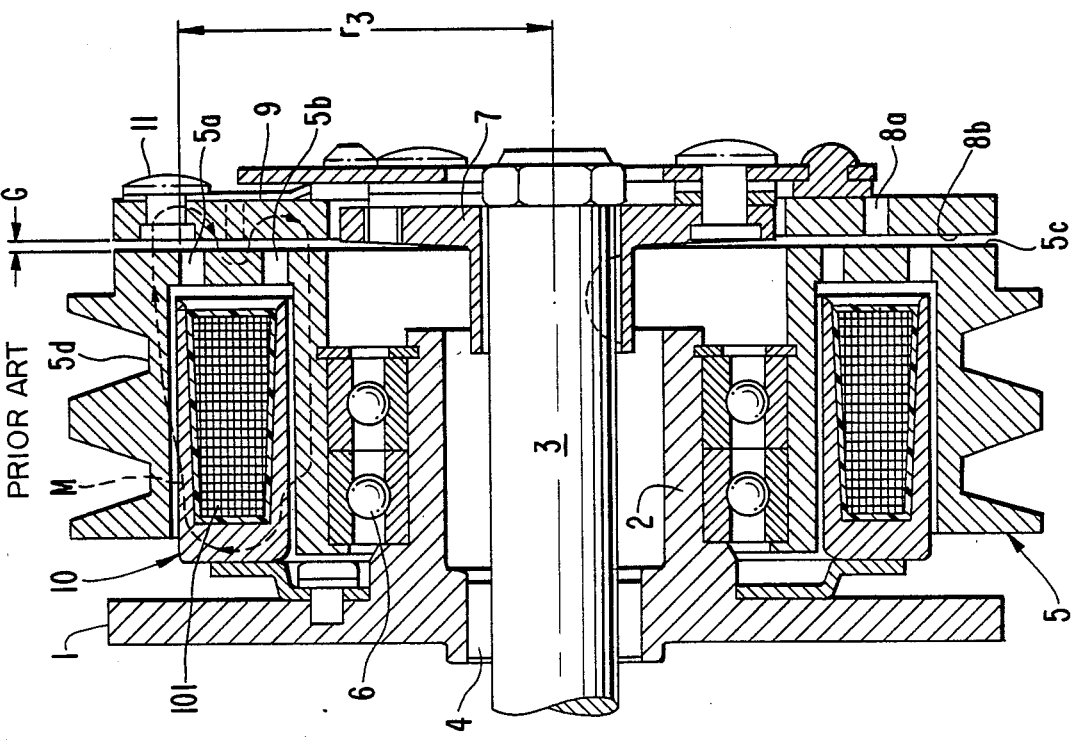
FIG. 2 is a cross-sectional view of an electromagnetic clutch in accordance with an embodiment of this invention.
Figure 3:
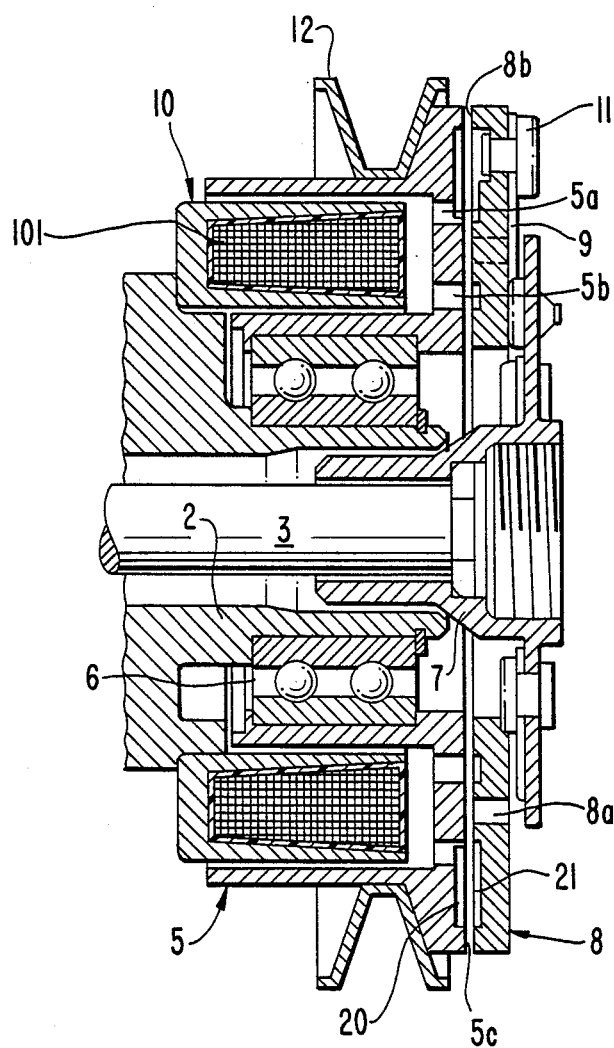
FIG. 3 is a cross-sectional view of an electromagnetic clutch in accordance with the embodiment of FIG. 2 having a modified rotor.

The construction of an electromagnetic clutch in accordance with a first embodiment of this invention is shown in FIG. 2. The structure of this electromagnetic clutch is the same as that shown in FIG. 1. Therefore, structures and parts shown in FIG. 1 are labelled by the same reference numerals. In this embodiment, rotor 5 is provided with a plurality of U-shaped grooves on its outer peripheral surface. Alternatively, a single or double U-shaped grooves may be used, as shown in FIG. 3.

An annular groove 20 is formed on pole face 5c of rotor 5. The inner edge of annular groove 20 extends within concentric arcuate slit 5a while the outer edge of groove 20 is in close proximity to the outer circumferential surface of pole face 5c. Annular groove 21 is formed on pole face 8b of armature plate 8 and is located directly across from annular groove 20.

When electromagnetic coil 101 of electromagnet 10 is energized, a magnetic flux M is generated and passes through a magnetic passageway formed within electromagnet 10, rotor 5 and armature plate 8 as shown by the dotted line in FIG. 2. Pole face 8b of armature plate 8 is thus attracted to pole face 5c of rotor 5. Magnetic flux M originates at pole face 5c of rotor 5 and then passes into the outer circumferential surface of pole face 8b of armature plate 8. In this embodiment, annular grooves 20, 21, formed on pole faces 5c, 8b, force the flux to follow this longer path through the outer circumferential surface pole face 8b.

In general, when magnetic flux passes between two opposed surfaces, the attractive force P between the surfaces can be calculated from the following equation:

$$P = 4.06 \times 10^4 \times M^2/S$$

where S is the area of the opposed surfaces and M is magnetic flux.

The frictional torque T, produced by the attraction of pole face 8b to pole face 5c, can be determined from the follwing equation:

$$T = P \times U \times r$$

where P is the attractive force, U is the coefficient of friction and r is the average effective radius of an annular frictional surface. Note that the frictional torque T may be increased at constant attractive force P and coefficient of friction U by increasing the effective radius of the annular frictional surface.

The average effective radius r of an annular surface may be determined using the equation:

$$r = \frac{2}{3} \frac{rs^3 - rt^3}{rs^2 - rt^2}$$

where $r_s$ is the outer annular radius and $r_t$ is the inner annular radius.

When the annular groove is formed on the pole faces, as shown in FIG. 2, the outer annular radius rs is equal to the outer radius r1 of rotor 5. Inner annular radius rt is equal to the outer radius r2 of the annular groove. Thus, the average effective radius ra of the annular frictional surface located outside concentric arcuate slit 5a is given by:

$$ra = \frac{2}{3} \frac{r1^3 - r2^3}{r1^2 - r2^2}$$

When an annular groove is not formed on the pole face as shown in FIG. 1, the outer annular radius rs remains equal to outer radius r1 of rotor 5 but inner annular radius rt is equal to outer radius r3 of concentric arcuate slit 5a. Thus, the average effective radius rb of such an annular frictional surface is determined from the following equation.

$$rb = \frac{2}{3} \frac{r1^3 - r3^3}{r1^2 - r3^2}$$

Since outer annular radius r2 of the annular groove is greater than outer annular radius r3 of concentric arcuate slit 5a ($r_2 > r_3$), the average effective radius ra is always greater than average effective radius rb. Therefore, the frictional torque T may be increased by forming an annular groove while maintaining constant areas S, magnetic flux M and coefficient of friction U.

FIG. 2 depicts annular grooves formed on both frictional surfaces to increase the magnetic resistance. This tends to force the magnetic flux to pass through the outer magnetic region of small magnetic resistance. It is desirable to form annular grooves on both surfaces to make this resistance as large as possible. However, even if only a single annular groove is formed on one of the frictional surfaces, comparable effectiveness may be attained if the annular groove is formed with enough depth to offer a resistance similar to the two groove configuration.

Figure 5:
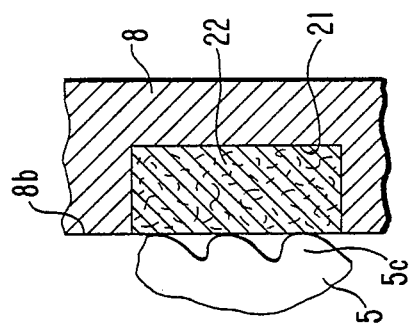
FIG. 5 is an enlarged view of area A in FIG. 4.
Figure 4:
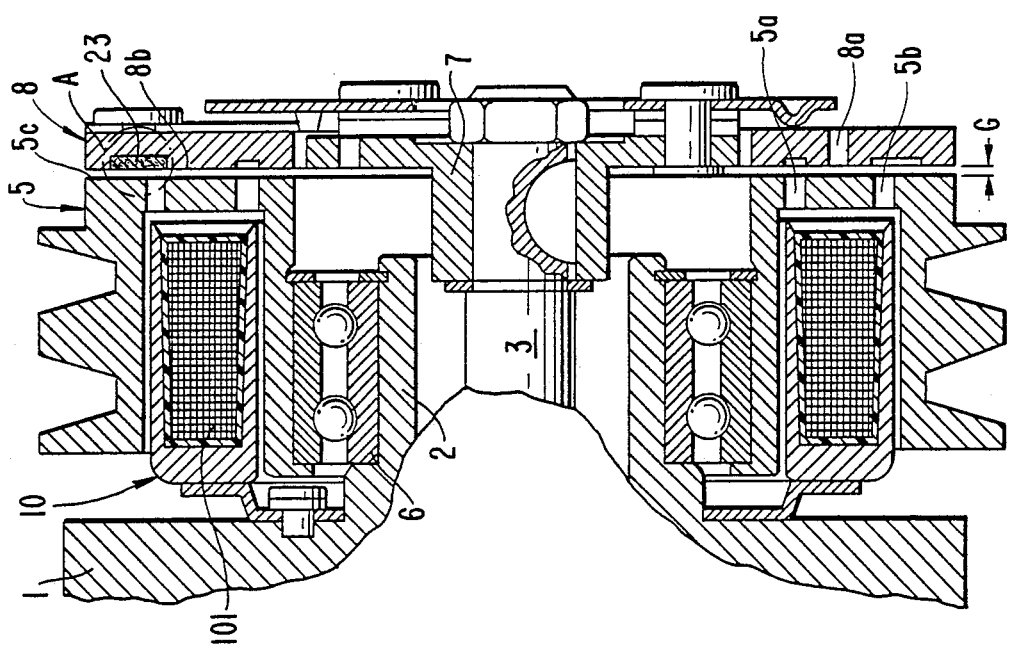
FIG. 4 is a cross-sectional view of an electromagnetic clutch in accordance with the another embodiment of this invention.

With reference to FIG. 4, the construction of an electromagnetic clutch in accordance with another embodiment of this invention is shown. Frictional member 22, made of non-magnetic material, is disposed within annular groove 21 formed on pole face 8b of armature plate 8. The non-magnetic material may be for example, fiber pulp, asbestos or phenol resin. Pole face 5c of rotor 5 facing armature plate 8 is formed by cutting so that the surface of pole face 5c is blunt as shown in FIG. 5. Thus, the engagement between rotor 5 and armature plate 8 is better secured due to frictional member 22. If pole face 5a of rotor 5 is finished by cutting to form a blunt surface, the wearing out of frictional member 22 is reduced.

This invention has been described in detail in connection with the preferred embodiment but these are examples only and the invention is not restricted thereto. It will be easily understood, by those skilled in the art that other variations and modifications can be easily made within the scope of this invention.

We claim:

1. In an electromagnetic clutch including a first rotatable member rotatably supported on a first bearing, said first rotatable member having an axial magnetic end plate with at least one arcuate slit, a second rotatable member rotatably supported on a second bearing, an annular magnetic member supported on said second rotatable member in a manner which permits limited axial movement of said annular magnetic member, said annular magnetic member facing said axial magnetic end plate of said first rotatable member with an axial gap therebetween, and electromagnetic means associated with said first rotatable member for attracting said annular magnetic member supported on said second rotatable member, the improvement comprising:
   a first annular groove formed in said axial magnetic end plate, an outer edge of said first annular groove adjacent an outer surface of said first rotatable member and an inner edge of said first annular groove adjacent said at least one arcuate slit; and
   a second annular groove formed in said annular magnetic member opposite said first annular groove.

2. An electromagnetic clutch comprising:
   a first rotatable member rotatably supported on a first bearing, said first rotatable member having an axial magnetic end plate with at least one arcuate slit;
   a second rotatable member rotatably supported on a second bearing;
   an annular magnetic member supported on said second rotatable member in a manner which permits limited axial movement of said annular magnetic member, said annular magnetic member facing said axial magnetic end plate of said first rotatable member with an axial gap therebetween;
   electromagnetic means associated with said first rotatable member for attracting said annular magnetic member supported on said second rotatable member;
   a first annular groove formed in said axial magnetic end plate, an outer edge of said first annular groove adjacent an outer surface of said first rotatable member and an inner edge of said first annular groove adjacent said at least one arcuate slit; and
   a second annular groove formed in said annular magnetic member opposite said first annular groove.

* * * * *

UNITED STATES PATENT AND TRADEMARK OFFICE
CERTIFICATE OF CORRECTION

PATENT NO. : 4,892,176

DATED : January 9, 1990

INVENTOR(S) : Takashi Matsushita et al.

It is certified that error appears in the above-identified patent and that said Letters Patent is hereby corrected as shown below:

Face of Patent, Section [19], delete "Takashi" and insert —Matsushita—;

Face of Patent, Section [75], Inventors:, delete in its entirety and insert —Takashi Matsushita, Isesaki, Fumiaki Uehara, Takasaki, both of Japan—;

Column 1, line 34, delete "jointed" and insert —joined—;

Column 1, lines 43-44, delete "hoursing" and insert —housing—;

Column 2, line 15, after "axis" insert —of—; and

Column 3, line 18, delete "follwing" and insert —following—.

Signed and Sealed this

Ninth Day of July, 1991

Attest:

HARRY F. MANBECK, JR.

Attesting Officer

Commissioner of Patents and Trademarks